(12) United States Patent
Ikuta (10) Patent No.: US 9,748,869 B2
(45) Date of Patent: Aug. 29, 2017

(54) VIBRATION POWER GENERATOR

(71) Applicant: OMRON Corporation, Kyoto-shi, Kyoto (JP)

(72) Inventor: Masayo Ikuta, Kyoto (JP)

(73) Assignee: OMRON Corporation, Kyoto (JP)

(*) Notice: Subject to any disclaimer, the term of this patent is extended or adjusted under 35 U.S.C. 154(b) by 154 days.

(21) Appl. No.: 14/758,140

(22) PCT Filed: Dec. 16, 2013

(86) PCT No.: PCT/JP2013/083554
§ 371 (c)(1),
(2) Date: Jun. 26, 2015

(87) PCT Pub. No.: WO2014/103762
PCT Pub. Date: Jul. 3, 2014

(65) Prior Publication Data
US 2015/0333661 A1    Nov. 19, 2015

(30) Foreign Application Priority Data
Dec. 28, 2012  (JP) ................. 2012-288169

(51) Int. Cl.
*H02N 1/10* (2006.01)
*H02N 1/08* (2006.01)
*H02N 1/06* (2006.01)

(52) U.S. Cl.
CPC ............ *H02N 1/08* (2013.01); *H02N 1/06* (2013.01); *H02N 1/10* (2013.01)

(58) Field of Classification Search
CPC .................... H02N 1/08; H02N 1/10
(Continued)

(56) References Cited

U.S. PATENT DOCUMENTS

| 2010/0109472 A1* | 5/2010 | Naruse ................. H02N 1/006 310/300 |
| 2011/0266915 A1* | 11/2011 | Matsubara ............. H02N 1/08 310/300 |
| 2013/0134830 A1 | 5/2013 | Ikuta et al. |

FOREIGN PATENT DOCUMENTS

| CN | 102640411 A | 8/2012 |
| EP | 2525487 A1 | 11/2012 |

(Continued)

OTHER PUBLICATIONS

First Office Action issued in corresponding Chinese Application No. 201380067973.0, mailed on Aug. 31, 2016 (13 pages).
(Continued)

*Primary Examiner* — Terrance Kenerly
(74) *Attorney, Agent, or Firm* — Osha Liang LLP (57) ABSTRACT

A vibration power generator in which an electret group including a plurality of electrets and an electrode group including a plurality of electrodes are displaced in a relative movement direction by an external vibration, and vibration power generation is thereby performed, has a housing portion that accommodates the electret group and the electrode group, a fixed member that is fixed to a bottom surface side of the housing portion and has one of the electret group and the electrode group as a fixed member-side power generation element, a movable member that is accommodated in the housing portion so as to be capable of relative movement by the external vibration while opposing the fixed member, and has the other of the electret group and the electrode group as a movable member-side power generation element, and a plurality of support members.

4 Claims, 5 Drawing Sheets

(58) Field of Classification Search
USPC .......................... 310/12.01–12.33, 300, 309
See application file for complete search history.

(56) References Cited

FOREIGN PATENT DOCUMENTS

| JP | 2008/278607 | A | 11/2008 | | |
|----|-------------|---|---------|---|---|
| JP | 2009-148124 | A | 7/2009 | | |
| JP | 2011-097807 | A | 5/2011 | | |
| JP | 2011097780 | | * | 6/2011 | ............... H02N 1/08 |
| JP | 2011-135710 | A | 7/2011 | | |
| JP | 2012-100404 | A | 5/2012 | | |
| WO | 2011/086830 | A1 | 7/2011 | | |

OTHER PUBLICATIONS

Notification of Reasons for Refusal issued in corresponding Japanese Application No. 2012-288169, mailed on Mar. 1, 2016 (6 pages).
Extended European Search Report issued in corresponding European Application No. 13868591.2, mailed on Dec. 21, 2015 (4 pages).
International Search Report issued in PCT/JP2013/083554 mailed on Mar. 11, 2014 (1 page).

* cited by examiner

VIBRATION POWER GENERATOR

TECHNICAL FIELD

The present invention relates to a vibration power generator that generates power by an external vibration.

BACKGROUND ART

Based on a current trend toward energy saving, attention is focused on environmental energy that is commonly present and is not dependent on fossil fuels or the like. As the environmental energy, power generation energy using sunlight or wind power is widely known, and an example of the environmental energy having an energy density similar to that of the above power generation energy includes vibration energy that is commonly present in surroundings.

A vibration power generator that generates power by using the vibration energy is developed, and an electret capable of holding electric charges semipermanently is widely used in the power generator. In the case where vibration power generation is performed by using the electret, it is required to maintain a gap between the electret and an electrode at a predetermined distance that allows excellent power generation efficiency. To cope with this, as described in Patent Document 1, Patent Document 1 discloses a technique in which, in a structure in which a substrate provided with the electret and a substrate provided with the electrode oppose each other, an adjustment member for adjusting the gap is disposed between a support member that supports one of the substrates and a support member that supports the other substrate.

In addition, as a configuration for maintaining the gap between the electret and the electrode, as described in Patent Document 2, there is disclosed a gap formation technique that is made less likely to be influenced by a thickness error of a substrate constituting a movable member by providing a first reference surface for mounting a fixed member and a second reference surface for positioning a slidable steel ball for supporting the movable member in a housing of a vibration power generator that generates power by relative movement of the movable member and the fixed member, fixing the fixed member via the first reference surface, and disposing the movable member via the second reference surface and the steel ball. Further, Patent Document 3 discloses a technique that suppresses narrowing of a gap between a movable member and a fixed member by using repulsion by electric charges.

CITATION LIST

Patent Literature

[PTL 1]
Japanese Patent Application Laid-open No. 2009-148124
[PTL 2]
International Publication No. WO 2011/086830
[PTL 3]
Japanese Patent Application Laid-open No. 2008-278607

SUMMARY OF INVENTION

Technical Problem

As described above, in the vibration power generator that uses the electret, the size of the gap between the electret and the electrode significantly influences the power generation efficiency. Accordingly, in the assembly of the vibration power generator, it is considered important to adjust the gap such that the gap has a distance that allows the excellent power generation efficiency and maintain the distance. Herein, in the conventional art according to Patent Document 1 described above, it is necessary to perform the adjustment via the adjustment member, and hence it is not easy to adjust the gap such that the gap has a proper size.

In the conventional art according to Patent Document 2 described above, the two reference surfaces for the gap formation are disposed in the housing of a vibration power generation element. However, with regard to a slide surface of the steel ball that supports the movable member, i.e., the second reference surface as one of the two reference surfaces, a part of the housing functions as the second reference surface, and a groove portion in which the steel ball slides is formed by the configuration of the housing. Accordingly, the distortion and dimensional accuracy of the housing tend to influence the second reference surface, and there are cases where it is difficult to suitably form the gap between the electret and the electrode. In general, there are cases where a resin material is used as the material of the housing of the vibration power generator from the viewpoint of easiness in manufacturing. The resin material is easily deformed due to influences of machining and an ambient temperature, and hence the influence on the second reference surface described above is likely to occur. The conventional art according to Patent Document 3 suppresses the narrowing of the gap between the movable member and the fixed member by using the repulsion by electric charges, and dose not offer a useful suggestion on how to form the gap suitably.

The present invention has been achieved in view of the above problems, and an object thereof is to provide a technique for suitably forming the gap between the electret and the electrode in the vibration power generator that generates power by relatively moving the electret and the electrode in a state in which the electret and the electrode oppose each other.

Solution to Problem

In the present invention, in order to solve the above problems, the following configuration has been adopted. That is, the present invention is a vibration power generator in which an electret group including a plurality of electrets and an electrode group including a plurality of electrodes are displaced in a relative movement direction by an external vibration, and vibration power generation is thereby performed, including a housing portion that accommodates the electret group and the electrode group, a fixed member that is fixed to a bottom surface side of the housing portion and has one of the electret group and the electrode group as a fixed member-side power generation element, a movable member that is accommodated in the housing portion so as to be capable of relative movement by the external vibration while opposing the fixed member, and has the other of the electret group and the electrode group as a movable member-side power generation element, and a plurality of support members that are disposed so as to be slidable on the fixed member, are interposed directly between the fixed member and the movable member so as to define a gap between the fixed member-side power generation element and the movable member-side power generation element, and support the movable member so as to allow relative movement of the movable member with respect to the fixed member. The fixed member has a power generation substrate including the fixed member-side power generation element, and a slide substrate that is stacked on the power generation substrate on a side opposite to the movable member in an opposing direction of the fixed member and the movable member, and has slide surfaces on which the plurality of support members slide and which are formed on a common substrate surface.

In the vibration power generator according to the present invention, the electret group and the electrode group are displaced in the relative movement direction by the external vibration, and the vibration power generation is thereby performed. Herein, one of the electret group and the electrode group is disposed in the fixed member as the fixed member-side power generation element, and the other thereof is disposed in the movable member as the movable member-side power generation element. Both of the members are accommodated in the housing portion, and the fixed member is fixed to the housing portion while the movable member is disposed so as to be capable of the relative movement with respect to the fixed member, whereby the relative movement of the electret group and the electrode group for the vibration power generation is realized.

Herein, the plurality of support members are interposed directly between the movable member and the fixed member, and support the movable member so as to allow the relative movement of the movable member. Of the power generation substrate and the slide substrate as two substrates that are stacked on each other and included in the fixed member, the slide surfaces of the support members are formed on the slide substrate on the side of the fixed member. The slide surfaces on the side of the movable member are formed on the surface of the movable member. Consequently, the accuracy of a gap (hereinafter referred to as a "power generation gap") that is a gap between the movable member-side power generation element provided in the movable member and the fixed member-side power generation element provided in the fixed member and significantly influences power generation efficiency of the vibration power generator reflects, in addition to a variation in a thickness direction of the power generation substrate adjacent to and stacked on the slide substrate, i.e., the opposing direction of the fixed member and the movable member (hereinafter simply referred to as the "opposing direction") and a variation in a height direction of the slide member (i.e., the opposing direction) that are practically easily suppressed, a variation of a position in a height direction of a reference surface for determining the height of the movable member relative to the fixed member in the opposing direction that also serves as a surface (the slide surface) on which the support member slides and is in contact with the fixed member.

In the conventional art, as described above, since the slide surface has been formed of a part of the housing, the reference surface has been likely to vary due to influences of the distortion and dimensional accuracy of the housing. However, in the vibration power generator according to the present invention, as described above, the slide surfaces of the plurality of support members are formed on the common substrate surface of the slide substrate. This means commonality of the reference surface for positioning the movable member with respect to the fixed member in the opposing direction for the plurality of the support members and, with this, it becomes possible to eliminate the variation of the position of the reference surface in the opposing direction between the support members as much as possible. As a result, the adjustment of the power generation gas is facilitated, and it becomes possible to maintain the suitable size of the power generation gap stably.

Practically, even when the commonality of the reference surface described above is performed, the distortion (a variation of the flatness) of the substrate surface of the slide substrate is present as the variation of the reference surface. To cope with this, it is preferable to form the slide surfaces for the plurality of support members on the substrate surface after the flatness of the substrate surface of the slide substrate is improved as much as possible. From the viewpoint of the material of the slide surface, it is preferable to manufacture the slide substrate by using a glass material in order to improve the flatness.

In addition, practically, there are cases where the power generation substrate and the slide substrate are fixed to each other using an adhesive or the like in order to stack the substrates on each other and fix the substrates to each other. In such cases, the accuracy of the power generation gap reflects a variation of the thickness of an adhesive layer. In the case where the substrates are fixed to each other using the adhesive, there is a possibility that the distortion by a thermal stress becomes conspicuous when the material of the power generation substrate is different from the material of the slide substrate, and hence the material of the power generation substrate is preferably similar to that of the slide substrate, and it is possible to use, e.g., the glass material or a ceramic material.

In the vibration power generator described above, the slide surfaces of the plurality of support members may be formed on substrate surfaces on both sides of the slide substrate with the power generation substrate interposed between the substrate surfaces so as to extend in the relative movement direction of the movable member with respect to the fixed member. By configuring the slide surfaces in this manner, it becomes possible to stably support the movable member using the plurality of support members.

In addition, in the vibration power generator described above, the fixed member may be fixed in a state in which the fixed member is in contact with a housing portion-side contact surface provided in the housing portion, and a fixed member-side contact surface, which is a contact surface of the fixed member that is in contact with the housing portion-side contact surface, may be formed on a part of the substrate surface of the slide substrate that does not overlap the slide surfaces on which the plurality of support members slide. That is, the fixed member comes in contact with the housing portion-side contact surface, and the fixed member is thereby positioned relative to the housing. At this point, the housing portion comes in contact with a portion located not on the power generation substrate but on the slide substrate that does not overlap the slide surfaces (the fixed member-side contact surface), and hence it is possible to prevent a useless external force from being applied to the fixed member-side power generation element when the fixed member is fixed, and suitable formation and maintenance of the power generation gap are performed.

Note that, in the vibration power generator described above, the support member may be a steel ball that supports the movable member so as to allow the relative movement of the movable member by rotating. In this case, it is possible to reduce a frictional force by the support member, and more efficient vibration power generation can be expected to be realized. In addition, instead of the steel ball, it is also possible to use, as the support member, a slidable member that supports the movable member so as to allow the relative movement of the movable member by sliding on the slide surface.

Advantageous Effects of Invention

In the vibration power generator that generates power by relatively moving the electret and the electrode in the state in which the electret and the electrode oppose each other, it becomes possible to suitably form the gap between the electret and the electrode.

DESCRIPTION OF EMBODIMENTS

Hereinbelow, a vibration power generator according to an embodiment of the present invention will be described with reference to the drawings. Note that the configuration of the following embodiment is shown by way of example only, and the present invention is not limited to the configuration of the embodiment.

Figure 1:
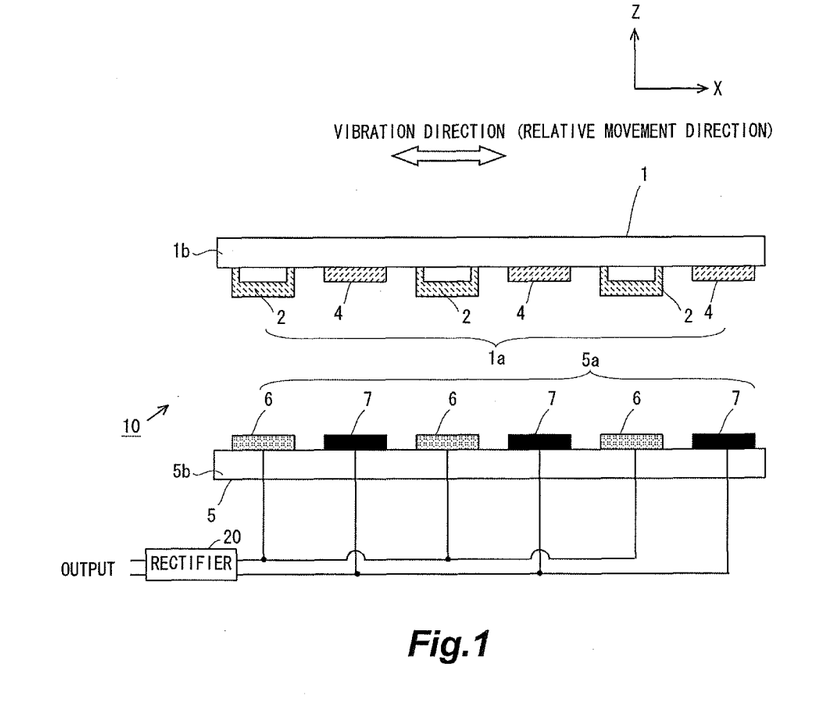
FIG. 1 is a view showing schematic configurations of an electret group and an electrode group of a vibration power generator according to the present invention.

FIG. 1 shows a schematic configuration of a vibration power generator 10 according to the present invention, especially configurations of an electret group 1a and an electrode group 5a provided in a movable member 1 and a fixed member 5 that perform vibration power generation by an external vibration. Note that, in FIG. 1, a direction in which the electret and the electrode are arranged that also serves as a relative movement direction of the movable member 1 with respect to the fixed member 5 is assumed to be an X direction, a direction in which the movable member 1 and the fixed member oppose each other is assumed to be a Z direction, and a direction orthogonal to the X direction and the Z direction is assumed to be a Y direction. FIG. 1 is a cross-sectional view obtained when the vibration power generator 10 is cut using a ZX plane.

In the vibration power generator 10, the movable member 1 and the fixed member 5 are accommodated in a housing 11 shown in FIG. 2A and the like described later. The movable member 1 and the fixed member 5 are configured to be movable relative to each other while maintaining a state in which they oppose each other, and a support structure of the movable member 1 that allows the relative movement will be described later. In addition, the fixed member 5 is fixed to the housing 11, and the fixing will also be described later. In contract, both ends of the movable member 1 are coupled to the housing 11 using springs 14 (see FIG. 2 or the like), and hence the movable member 1 is configured to reciprocate (vibrate) relative to the fixed member 5 fixed to the housing 11 by an external vibration.

Note that the movable member 1 and the fixed member 5 are configured to be movable relative to each other in the state in which they oppose each other and in a state in which they are parallel with each other, i.e., a distance between opposing surfaces is kept constant. With this, by an operation of an electret 2 on the side of the movable member 1, it becomes possible to generate an electric signal in a pair of electrodes 6 and 7 on the side of the fixed member 5. The principle of generation of the electric signal is the conventional art, and hence the detailed description thereof will be omitted in the present description. The configuration that maintains the distance between the movable member 1 and the fixed member 5 will also be described later.

Herein, the structure on the side of the movable member 1 will be described. In the movable member 1, the electret group 1a is formed on an electret substrate 1b. The electret group 1a is provided on the side of the surface of the movable member 1 opposing the fixed member 5, and includes a plurality of the electrets 2 formed on respective conductive materials and a plurality of guard electrodes 4 that are not grounded. The electrets 2 and the guard electrodes 4 are disposed so as to be alternately arranged along the relative movement direction (the X direction) of the movable member 1 with respect to the fixed member 5. The plurality of electrets 2 and the plurality of guard electrodes 4 are formed into comb-like shapes, and the electrets 2 and the electrodes 4 are disposed telescopically. However, as described above, since FIG. 1 is the ZX cross-sectional view, the electrets 2 and the guard electrodes 4 are depicted such that they are alternately disposed. In the present embodiment, the electret 2 is configured to hold negative charges semipermanently.

Note that, as described above, with regard to the guard electrode 4, the present embodiment adopts the configuration in which the guard electrode 4 is not grounded, but the configuration in which the guard electrode 4 is grounded may also be adopted instead of the above configuration. By grounding the guard electrode 4, it is possible to obtain an electric signal corresponding to the external vibration as a stable signal having 0 V as its center using a first electrode 6 and a second electrode 7 described later, and hence the configuration in which the guard electrode 4 is grounded is useful for stable detection of the external vibration.

Next, the structure on the side of the fixed member 5 will be described. In the fixed member 5, the electrode group 5a is formed on an electrode substrate 5b. The electrode group Sa is provided on the side of the surface of the fixed member 5 opposing the movable member 1, and includes a plurality of small electrode groups each having a pair of the electrodes (the first electrode 6 and the second electrode 7).

In the thus configured vibration power generator 10, due to a relative positional fluctuation of the movable member 1 having the electrets 2 with respect to the fixed member 5 by the external vibration, an electromotive force corresponding to the relative positional fluctuation (vibration) is generated between the electrodes 6 and 7, and power generation is performed. The generated power is rectified by a rectifier 11, and serves as an output of the vibration power generator 10.

First Embodiment

Figure 2A:
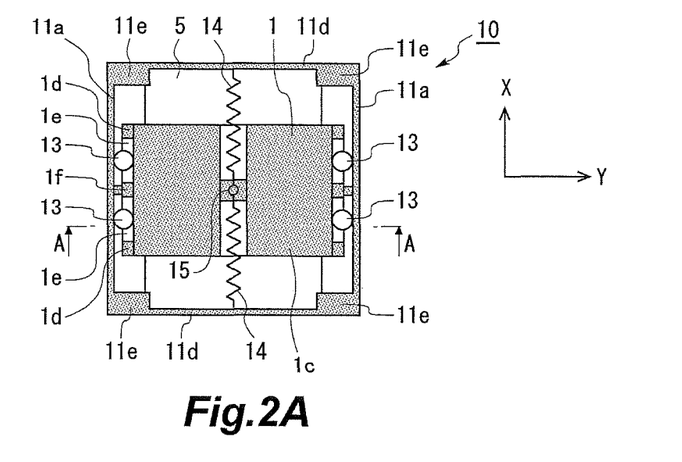
FIG. 2A is a top view of the vibration power generator according to the present invention.
Figure 2B:
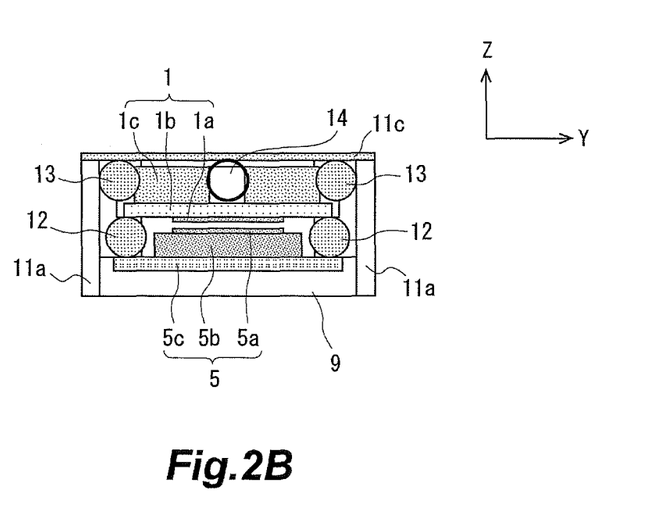
FIG. 2B is a cross-sectional view of the vibration power generator shown in FIG. 2A.

Each of FIGS. 2A and 2B shows the schematic configuration of the vibration power generator 10 according to the present embodiment. FIG. 2A is a top view of the vibration power generator 10 (a top view in an XY plane), and FIG. 2B is a cross-sectional view taken along A-A of FIG. 2A (a cross-sectional view in a ZY plane). Note that FIG. 2A shows a state in which an upper surface 11c of the housing 11 is detached, and the inside is visible from above. As can be seen from these drawings, the fixed member 5 that includes the electrode group 5a and the electrode substrate 5b and the movable member 1 that includes the electret group 1a and the electret substrate 1b are accommodated in the housing 11 of the vibration power generator 10. The housing 11 has a substantially rectangular parallelepiped shape, and has the upper surface 11c, a pair of side surfaces 11a that extend in the X direction as the relative movement direction of the movable member 1, and a pair of side surfaces 11d that are side surfaces orthogonal to the relative movement direction and extend in the Y direction. Note that, as will be described later, with regard to a bottom surface of the housing 11, the fixed member 5 is mounted to the housing 11, and one surface of the fixed member 5 (a back surface of a base 9) thereby serves as the bottom surface of the housing 11.

As shown in FIG. 2B, the fixed member 5 further includes a slide substrate 5c in addition to the electrode group 5a and the electrode substrate 5b, and the fixed member 5 is formed by stacking these layers successively. Further, the fixed member 5 formed by stacking the layers is mounted to the bottom portion of the housing 11 in a state in which the fixed member 5 is mounted to the base 9. Consequently, as shown in FIG. 2B, after the mounting, the bottom surface of the base 9 is exposed to the outside of the housing 11, and the electrode group 5a is directed upward (the inner side of the housing 11). On the other hand, in contrast to the fixed member 5 fixed to the housing 11, the movable member 1 is supported so as to be capable of the relative movement with respect to the fixed member 5 via a support steel ball 12, and the support corresponds to support of the movable member 1 by a support member according to the present invention. Specifically, as shown in FIG. 2B, a plurality of the support steel balls 12 capable of supporting the movable member 1 are disposed between a portion on the electret substrate 1b that does not interfere with the electret group 1a and the slide substrate 5c. That is, the movable member 1 is further disposed on the plurality of support steel balls 12 disposed on the slide substrate 5c. In a state in which the movable member 1 is supported by the support steel balls 12 in this manner, a power generation gap distance between the electret group 1a on the side of the movable member 1 and the electrode group 5a of the fixed member 5 is set to a predetermined distance suitable for vibration power generation.

With regard to the movable member 1, additional support steel balls 13 are disposed between the movable member 1 and inner wall surfaces of the side surfaces 11a such that the row of the electrodes 6 and 7 provided on the side of the fixed member 5 matches the row of the electrets 2 provided on the side of the movable member 1 as much as possible in the relative movement of the movable member 1 with respect to the fixed member 5. Note that the support steel ball 13 is supported by the configuration on the side of the movable member 1 so as not to fall downward, and the detailed configuration will be described later. Herein, in the movable member 1, a weight member 1c is mounted to the electret substrate 1b in a direction opposite to the electret group 1a. The weight member 1c is mounted in order to increase the inertia force of the movable member 1 and efficiently generate power by the external vibration. Consequently, the size and mass of the weight member 1c are appropriately set based on the magnitude of the external vibration assumed by the vibration power generator 10 or the like.

In the movable member 1, end-side protrusions 1d are disposed on both ends of the electret substrate 1b that oppose the inner wall surfaces of the side surfaces 11a of the housing 11, central protrusions 1f are disposed on the central portions of the electret substrate 1b, and support grooves 1e in which the support steel balls 13 can be disposed are formed between the end-side protrusions 1d and the central protrusions 1f. Consequently, as shown in FIG. 2A, two support grooves 1e are formed on each of the left and the right of the movable member 1, and the support steel balls 13 are disposed in the support grooves 1e. Thus, by disposing the support steel balls 13 between the movable member 1 and the inner wall surfaces of the housing 11 laterally to the movable member 1, it becomes possible to smoothly perform the movement of the movable member 1 with respect to the fixed member 5 along the relative movement direction.

Further, via a connection portion 15 provided in a substantially central portion in the XY plane of the movable member 1, the springs 14 are disposed between the movable member 1 and the two side surfaces 11d of the housing 11. In a state shown in FIG. 2A, the springs 14 are connected to substantially central portions of the side surfaces 11d, and the springs 14 are disposed such that an elastic force by each spring 14 acts in the relative movement direction (the X direction). By the elastic force of the spring 14, the movable member 1 having received the external vibration reciprocates in the housing 11, and efficient vibration power generation is thereby realized.

Thus, in the vibration power generator 10 according to the present embodiment, with regard to the movable member 1, the support to the slide substrate 5c by the Z-direction support steel ball 12 (hereinafter simply referred to as the "support steel ball 12") and the support to the side surface 11a by the Y-direction support steel ball 13 (hereinafter simply referred to as the "support steel ball 13") are performed independently of each other. With the presence of the supports, the relative movement direction is uniquely determined based on a geometric condition, and it is possible to stably perform the relative movement of the movable member 1 with respect to the fixed member 5.

Figure 3:
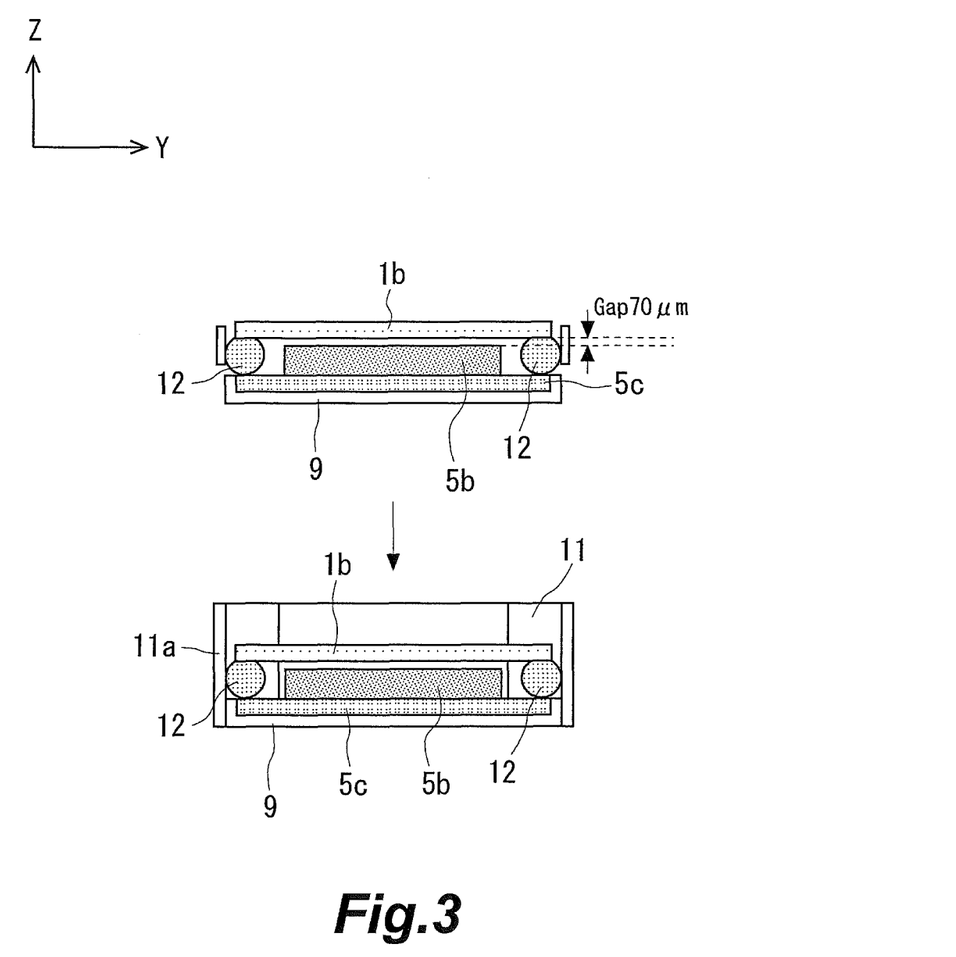
FIG. 3 is a view for explaining principles of the vibration power generator according to the present invention.

Herein, the support structure of the movable member 1 by the support steel ball 12 in the vibration power generator 10 according to the present embodiment will be described in detail based on FIG. 3. FIG. 3 shows a portion related to the support structure of the movable member 1 by the support steel ball 12 that is extracted from the structure of the vibration power generator 10 shown in FIG. 2B. Consequently, in FIG. 3, only the electret substrate 1b is depicted with regard to the movable member 1, only the electrode substrate 5b and the slide substrate 5c are depicted with regard to the fixed member 5, and the depiction of the electret group 1a and the electrode group 5a is omitted.

Figure 4:
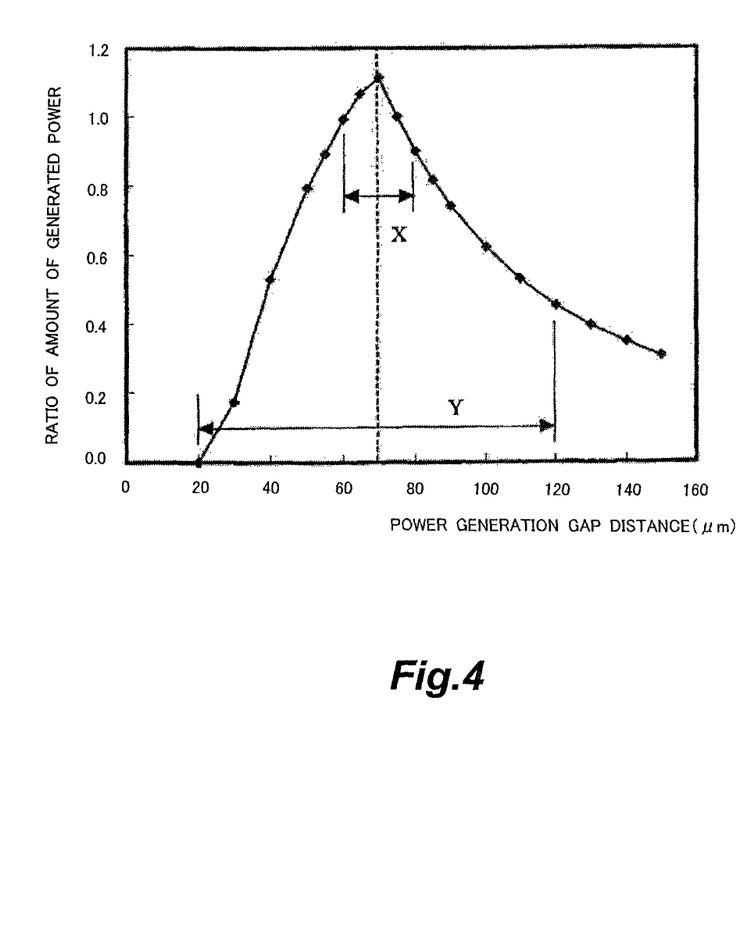
FIG. 4 is a view showing a correlation between a gap distance between the electret group and the electrode group and a ratio of amount of generated power related to vibration power generation in the vibration power generator according to the present invention.

FIG. 4 shows a correlation between the distance of the gap (power generation gap) between the electret group 1a and the electrode group 5a and a ratio of amount of generated power in the vibration power generator 10. The ratio of amount of generated power is a ratio related to the amount of generated power when the amount of generated power in the case where the power generation gap distance is 65 μm is assumed to be 1.

Herein, a maximum power output Pmax of the vibration power generator 10 can be calculated according to the following Expression 1 theoretically:

$$P\max = \sigma^2 nA \cdot 2\pi f / [(\epsilon_e \epsilon_0/d) \times ((\epsilon_e g/d)+1)]$$ (Expression 1).

Note that σ represents the surface charge density of the electret, n represents [amplitude of a pair of substrates÷electret pitch], A represents the maximum area in which the electret and the electrode overlap each other, $\epsilon_e$ represents the relative permittivity of the electret, d represents the thickness of the electret, $\epsilon_0$ represents the permittivity of vacuum, g represents the power generation gap distance, and f represents the frequency of the vibration inputted to the vibration power generator 10 from the outside.

As can be seen from FIG. 4, in the case where the power generation gap distance is set to, e.g., 70 μm at which the ratio of amount of generated power is maximized, when the power generation gap distance varies in a range indicated by Y in FIG. 4 due to the support structure of the vibration power generator 10, the ratio of amount of generated power greatly varies so that the manufacturing yield of the vibration power generator 10 is extremely reduced. On the other hand, when the variation of the power generation gap distance falls within a range indicated by X in FIG. 4, the fluctuation of the ratio of amount of generated power is small, and it is possible to maintain the high manufacturing yield of the vibration power generator 10.

In the case of the vibration power generator 10 according to the present invention, as shown in the upper part of FIG. 3, the support steel ball 12 is disposed directly on the substrate surface of the slide substrate 5c constituting the fixed member 5 instead of the electrode substrate 5b on which the electrode group 5a is disposed. This configuration is applied to all of the support steel balls 12 that are used in the vibration power generator 10 (four support steel balls 12 in the present embodiment). As a result, slide surfaces (a surface on which the support steel ball 12 slides while rolling when the movable member 1 performs the relative movement) of all of the support steel balls 12 are formed on the common substrate surface of the slide substrate 5c. With regard to the movable member 1, all of the support steel balls 12 are in contact with the electret substrate 1b, and hence all of the slide surfaces on the side of the movable member 1 are formed on the substrate surface of the electret substrate 1b.

With regard to the slide substrate 5c, the slide substrate 5c is manufactured such that the flatness of the substrate surface on which the slide surfaces of all of the support steel balls 12 are formed is extremely high (i.e., a variation of the flatness of the substrate surface is small). Specifically, in order to increase the flatness, the slide substrate 5c is manufactured by using a glass material. The flatness of the slide substrate 5c is a value obtained by measuring the surface height of the slide substrate 5c at a plurality of points (not less than four points), and measuring the displacement of the surface height at the other measurement point relative to a reference surface defined by the three measurement points. The electret substrate 1b is also manufactured by using the glass material such that the flatness of the electret substrate 1b is extremely high.

As shown in FIG. 4, the power generation gap distance significantly influences the power generation efficiency of the vibration power generator 10 and, in the vibration power generator 10 having the support structure between the movable member 1 and the fixed member 5 shown in FIG. 3, the variation of the power generation gap distance reflects a variation in the thickness direction (the Z direction) of the electrode substrate 5b (hereinafter referred to as a "first variation"), a variation in the height direction (the Z direction) of the support steel ball 12 (hereinafter referred to as a "second variation"), and a variation of the position in the height direction (the Z direction) of the slide surface among the slide surfaces of the plurality of support steel balls 12 that slide on and are in contact with the slide surfaces (hereinafter referred to as a "third variation") from the viewpoint of the structure of the vibration power generator 10.

Each of the first variation and the second variation is a variation of the dimension of the member. With regard to the first variation related to the electrode substrate 5b, similarly to the slide substrate 5c, by manufacturing the electrode substrate 5b by using the glass material, it is possible to increase the flatness and, as a result, it is possible to reduce the value of the first variation to a relatively small value. With regard to the second variation related to the support steel ball 12, by increasing the machining accuracy of the support steel ball 12, it is possible to reduce the value of the second variation to a relatively small value. Consequently, it is easy to control these variations.

With regard to the third variation, as described above, the slide surfaces of all of the support steel balls 12 used in the vibration power generator 10 are formed on the common substrate surface of the slide substrate 5c, and the slide substrate 5c is formed so as to have the extremely high flatness. Consequently, it is also possible to reduce the third variation to a relatively small value. In the manufacturing of the vibration power generator 10, the vibration power generator 10 is completed (a state shown in the lower part of FIG. 3) by fitting the housing 11 in a state in which the movable member 1 and the fixed member 5 oppose each other with the support steel ball 12 interposed therebetween (a state shown in the upper part of FIG. 3). At this point, the housing 11 does not influence the power generation gap distance between the movable member 1 and the fixed member 5. Accordingly, the vibration power generator 10 has the support structure capable of reducing the possibility that the third variation occurs in the manufacturing process as much as possible. Further, the slide substrate 5c manufactured by using the glass material has high resistances to continuous slide of the support steel ball 12, a thermal stress resulting from change of an external temperature, and the like. Accordingly, in the vibration power generator 10, the third variation is unlikely to occur and, as a result, it is possible to maintain the suitable power generation efficiency for a long period of time.

Thus, in the vibration power generator 10, it is possible to reduce various variations that should be considered from the viewpoint of its structure and influence the power generation gap distance and, as a result, it is possible to facilitate the manufacturing of the vibration power generator 10, and improve the yield thereof. Note that, as factors that influence the power generation gap distance, variations resulting from a manufacturing method are present practically in addition to the variations that should be considered from the viewpoint of the structure described above. For example, in the case where a method that fixes the electrode substrate 5b and the slide substrate 5c to each other using an adhesive is adopted, a variation in the height direction (the Z direction) of the adhesive influences the power generation gap distance. However, even in view of this point, the usefulness of the configuration for suppressing the variations that should be considered from the viewpoint of the structure, i.e., the usefulness of the support structure shown in FIG. 3 is remarkable.

REFERENCE SIGNS LIST

1: movable member
1a: electret group
1b: electret substrate
1c: weight member
2: electret
5: fixed member
5a: electrode group
5b: electrode substrate
5c: slide substrate
6 and 7: electrode
10: vibration power generator
11: housing 11*a*: side surface
11*d*: side surface
12: support steel ball (Z-direction support steel ball)
13: support steel ball (Y-direction support steel ball)
14: spring
15: connection portion

The invention claimed is:

1. A vibration power generator in which an electret group including a plurality of electrets and an electrode group including a plurality of electrodes are displaced in a relative movement direction by an external vibration, and vibration power generation is thereby performed, comprising:
   a housing portion that accommodates the electret group and the electrode group;
   a fixed member that is fixed to a bottom surface side of the housing portion and has one of the electret group and the electrode group as a fixed member-side power generation element;
   a movable member that is accommodated in the housing portion so as to be capable of relative movement by the external vibration while opposing the fixed member, and has the other of the electret group and the electrode group as a movable member-side power generation element;
   a plurality of first support members that are disposed so as to be slidable on the fixed member, are interposed directly between the fixed member and the movable member so as to define a gap between the fixed member-side power generation element along a direction in which the movable member and the fixed member oppose each other and the movable member-side power generation element, and support the movable member so as to allow relative movement of the movable member with respect to the fixed member; and
   a plurality of second support members that are disposed between the movable member and inner wall surfaces of the housing laterally to the movable member so as to define a gap along a direction orthogonal to a direction of the relative movement and the direction in which the movable member and the fixed member oppose each other, and support the movable member with respect to the inner wall surfaces of the housing, wherein
   the fixed member has:
   a power generation substrate including the fixed member-side power generation element; and
   a slide substrate that is stacked on the power generation substrate on a side opposite to the movable member in an opposing direction of the fixed member and the movable member, and has slide surfaces on which the plurality of first support members slide and which are formed on a common substrate surface.

2. The vibration power generator according to claim 1, wherein
   the slide surfaces of the plurality of first support members are formed on substrate surfaces on both sides of the slide substrate with the power generation substrate interposed between the substrate surfaces so as to extend in the relative movement direction of the movable member with respect to the fixed member.

3. The vibration power generator according to claim 1, wherein
   the fixed member is fixed in a state in which the fixed member is in contact with a housing portion-side contact surface provided in the housing portion, and
   a fixed member-side contact surface, which is a contact surface of the fixed member that is in contact with the housing portion-side contact surface, is formed on a part of the substrate surface of the slide substrate that does not overlap the slide surfaces on which the plurality of first support members slide.

4. The vibration power generator according to claim 1, wherein
   the power generation substrate and the slide substrate are each a substrate formed of a glass material.

* * * * *